(12) United States Patent
Schmidt

(10) Patent No.: US 12,468,942 B2
(45) Date of Patent: Nov. 11, 2025

(54) METHOD FOR TRAINING AND/OR VERIFYING A ROBUSTNESS OF AN ARTIFICIAL NEURAL NETWORK

(71) Applicant: Robert Bosch GmbH, Stuttgart (DE)

(72) Inventor: Frank Schmidt, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 783 days.

(21) Appl. No.: 17/869,979

(22) Filed: Jul. 21, 2022

(65) Prior Publication Data

US 2023/0039379 A1     Feb. 9, 2023

(30) Foreign Application Priority Data

Aug. 5, 2021 (DE) ...................... 10 2021 208 520.2

(51) Int. Cl.
*G06N 3/08*          (2023.01)
*B60W 40/02*       (2006.01)
(Continued)

(52) U.S. Cl.
CPC ............. *G06N 3/08* (2013.01); *G06V 10/761* (2022.01); *G06V 10/776* (2022.01); *G06V 10/82* (2022.01); *B60W 40/02* (2013.01); *G06N 3/082* (2013.01); *G06T 2207/10016* (2013.01); *G06T 2207/20081* (2013.01); *G06T 2207/20084* (2013.01);
(Continued)

(58) Field of Classification Search
CPC .... G06V 10/82; G06V 10/764; G06V 10/454; G06V 20/56; G06V 20/58; G06N 3/0454; G06N 3/08; G06N 3/082; G06T 2207/20084; G06T 2207/20081; G06T 2207/10016; H04N 19/85; B60W 40/02
See application file for complete search history.

(56) References Cited

U.S. PATENT DOCUMENTS

2020/0349673 A1* 11/2020 Yoo ........................... G06T 5/73
2022/0343641 A1* 10/2022 Runge .................... G06N 3/045

OTHER PUBLICATIONS

Neto et al., NPL1 ("ANN-based intelligent control system for simultaneous feed disturbances rejection and product specification changes in extractive distillation process" Published Nov. 5, 2020 by ASME Publishing 13 Pages (Year: 2020).*

(Continued)

*Primary Examiner* — Quoc A Tran
(74) *Attorney, Agent, or Firm* — NORTON ROSE FULBRIGHT US LLP

(57) ABSTRACT

A device, a method and a computer program for training and/or verifying the robustness of an artificial neural network. The artificial neural network is designed to determine an output variable. The method includes: predefining an input variable for the network which has a plurality of dimensions. For each dimension of the input variable or for each dimension of an output of a linear layer of the artificial neural network without an activation function to which the input variable is mapped by the artificial neural network, the method includes a determination of an upper input variable limit for which a disturbance variable model by which the input variable is able to be mapped to a disturbed input variable has the highest possible value in the dimension, and a determination of a lower input variable limit for which the disturbance variable model has the lowest value possible in the dimension.

14 Claims, 2 Drawing Sheets

(51) Int. Cl.
*G06N 3/082* (2023.01)
*G06V 10/44* (2022.01)
*G06V 10/74* (2022.01)
*G06V 10/764* (2022.01)
*G06V 10/776* (2022.01)
*G06V 10/82* (2022.01)
*G06V 20/56* (2022.01)
*G06V 20/58* (2022.01)
*H04N 19/85* (2014.01)

(52) U.S. Cl.
CPC .......... *G06V 10/454* (2022.01); *G06V 10/764* (2022.01); *G06V 20/56* (2022.01); *G06V 20/58* (2022.01); *H04N 19/85* (2014.11)

(56) References Cited

OTHER PUBLICATIONS

Bagheri et al., NPL2 ("Input-Output Analysis and Control Design Applied to a Linear Model of Spatially Developing Flows" Published 2009 by Elsevier Publishing 27 Pages (Year: 2009).*

Wong et al., "Scaling Provable Adversarial Defenses," Cornell University, 2018, pp. 1-22. <https://arxiv.org/abs/1805.12514> Downloaded Jul. 20, 2022.

Gowal et al., "On the Effectiveness of Interval Bound Propagation for Training Verifiably Robust Models," Cornell University, 2019, pp. 1-16. <https://arxiv.org/abs/1810.12715> Downloaded Jul. 20, 2022.

Wong et al., "Provable Defenses Against Adversarial Examples via the Convex Outer Adversarial Polytope," Proceedings of the 35th International Conference on Machine Learning, Stockholm, Sweden, PMLR 80, 2018, pp. 1-10.

* cited by examiner

METHOD FOR TRAINING AND/OR VERIFYING A ROBUSTNESS OF AN ARTIFICIAL NEURAL NETWORK

CROSS REFERENCE

The present application claims the benefit under 35 U.S.C. § 119 of German Patent Application No. 10 2021 208 520.2 filed on Aug. 5, 2021.

BACKGROUND INFORMATION

Artificial neural networks are used to enable autonomous driving and other autonomous actions that machines can perform. The training and verification of the robustness of such artificial neural networks is essential for the reliability and safety of these technical systems.

For an integration of systems in which already pretrained artificial neural networks are used and possibly for further training for a special task, a system integrator does not always have access to all aspects of the training process and/or verification process of a subcontractor.

It is therefore desirable to enable the training and/or verification of the robustness of such an artificial neural network.

One such possibility, for instance, is described in the paper by Eric Wong, Frank R. Schmidt, Jan Hendrik Metzen, J. Zico Kolter "Scaling provable adversarial defenses", which may be obtained at https://arxiv.org/abs/1805.12514.

One possibility, for example, is described in the paper by Sven Gowal, Krishnamurthy Dvijotham, Robert Stanforth, Rudy Bunel, Chongli Qin, Jonathan Uesato, Relja Arandjelovic, Timothy Mann, Pushmeet *Kohli* "On the Effectiveness of Interval Bound Propagation for Training Verifiably Robust Models", which can be obtained at https://arxiv.org/abs/1810.12715.

SUMMARY

With the aid of the method and the device and the computer program according to the present invention, a robust artificial neural network is trained or the robustness of an artificial neural network is verified.

A method for training and/or verifying a robustness of an artificial neural network, the artificial neural network being designed to determine an output variable, is provided according to the present invention. In accordance with an example embodiment of the present invention, the method includes the following: predefining an input variable for the network that has a plurality of dimensions, and for each dimension of the input variable or for each dimension of an output of a linear layer of the artificial neural network without an activation function to which the input variable is mapped by the artificial neural network, the method includes a determination of an upper input variable limit for which a disturbance variable model by which the input variable is able to be mapped to a disturbed input variable has the highest possible value in the dimension, and a determination of a lower input variable limit for which the disturbance variable model has the lowest possible value in the dimension, and for each dimension of the output variable, the method includes a determination of a lower output variable limit for the output variable of the network with values from a value range restricted by the lower input variable limits and the upper input variable limits, and a determination of an upper output variable limit for the output variable with values from the value range restricted by the upper input variable limits and the lower input variable limits, and the method includes a determination of the lowest possible value of an in particular real-valued function with values from a value range restricted by the lower output variable limit and the upper output variable limit, and the method includes a determination of the highest possible value of the in particular real-valued function with values from the value range restricted by the lower output variable limit and the upper output variable limit, and an output is determined that confirms a robustness of the network if the lowest possible value and the highest possible value lie within a predefined interval of permissible values.

The input variable is preferably represented by a digital image, in particular a video, radar, LiDAR, ultrasonic or infrared image.

In accordance with an example embodiment of the present invention, the output variable preferably represents a signal for actuating a physical system, in particular a computer-controlled machine, or a data transmission system, preferably of a robot, a vehicle, a household appliance, a driven tool of a production machine, a personal assistance system, an access control system, a monitoring system, or an in particular imaging medical system.

It may be provided that the output variable classifies sensor data, especially for detecting objects in the sensor data or for a semantic segmentation, or that the output variable provides a regression for sensor data, in particular for detecting objects in the sensor data or for a semantic segmentation, preferably objects representing markings or objects on or of road surfaces, in particular objects representing street signs, pedestrians or vehicles.

It may be provided that for each dimension, the lower input variable limit for which a scalar product of a unit vector of this dimension with the input variable is as low as possible is determined.

It may be provided that for each dimension of the input variable, the lower input variable limit of this dimension for which a first scalar product of a negative unit vector of this dimension with the input variable has the highest possible value is determined, and for each dimension of the input variable, the upper input variable limit of this dimension for which a second scalar product of a unit vector of this dimension with the input variable has the highest possible value is determined.

It may be provided that the output of the linear layer of the artificial neural network without an activation function is defined by a matrix, and a first product is defined for each dimension of the output, which is able to be determined by a multiplication of a negative transpose of the matrix with a unit vector of this dimension, the method providing that the lower input variable limit of this dimension for which a first scalar product of the first product with the input variable has the highest possible value is determined, and a second product is defined for each dimension of the output which is able to be determined by a multiplication of a transpose of the matrix with the unit vector of this dimension, the method providing that the upper input variable limit of this dimension for which a second scalar product of the second product with the input variable has the highest possible value is determined.

It may be provided that the artificial neural network provides a bias for the output, and the lower input variable limit and the upper input variable limit are corrected as a function of the bias.

It may be provided that the linear layer of the artificial neural network without an activation function is an input layer of the artificial neural network, or that a multitude of linear layers without an activation function is disposed between an input of the artificial neural network and the output of the linear layer of the artificial neural network without an activation function.

It may be provided that the input variable is determined as a function of a measured signal or is selected or will be selected from a value range.

It may be provided that if the lowest possible value or the highest possible value lies outside the predefined interval of permissible values or lies on its boundary, a value is determined from an interval between the lowest possible value and the highest possible value that has the greatest possible distance from the interval, and the network is trained to reduce the distance.

The device according to the present invention includes a processor device, which is designed to carry out the method(s) according to the present invention.

According to an example embodiment of the present invention, the device may include at least one memory for the input variable, and an output device, the input variable representing sensor data or the input variable representing variables that are measurable by a sensor and by which sensor data are predictable, and the output device is designed to output a signal, and the processor device is designed to determine the signal as a function of the output variable to which the artificial neural network maps the input variable. For sensor data, an actuation variable or a preprocessed sensor signal, for example, is output. For a measurable variable, especially a physical variable, a sensor signal, for instance, is output which substitutes one sensor for some other variable, in particular a physical variable.

The device may include an input device, which is designed to communicate with a sensor in order to acquire sensor data, the at least one processor device being designed to determine the input variable as a function of the sensor data.

In accordance with the present invention, a computer program includes computer-readable instructions which run the method(s) according to the present invention when the instructions are executed by a computer.

Further advantageous embodiments result from the following description and the figures.

DETAILED DESCRIPTION OF EXAMPLE EMBODIMENTS

Figure 1:
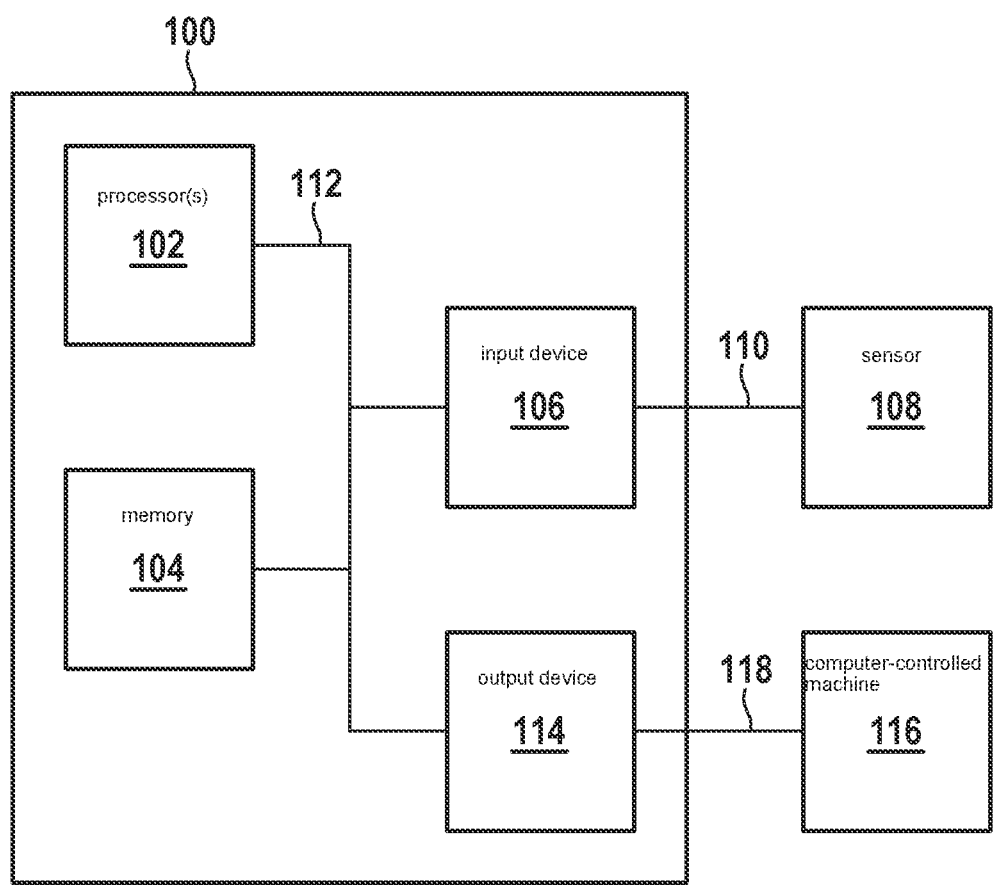
FIG. 1 shows a schematic representation of a device for training and/or verifying a robustness of an artificial neural network, in accordance with an example embodiment of the present invention.

FIG. 1 schematically shows a device 100. Device 100 includes at least one processor device such as at least one processor 102 and at least one memory 104.

In the example, the at least one memory 104 includes a computer program, which has computer-readable instructions that cause a method to run as described in the following text when the computer program is executed by at least one processor 102.

In the example, the at least one memory 104 includes an artificial neural network. The memory, for example, stores parameters that define weights of individual layers of the network and/or hyperparameters that define an architecture of the network and/or activation functions.

In the example, device 100 includes an input device 106, which is designed to receive sensor data from a sensor 108. Input device 106 may also be designed to select values from a value range that simulate values which represent sensor data of sensor 108. It may also be provided that the at least one processor 102 is designed to select the values from the value range. In the example, sensor 108 and input device 106 are connected via a line 110 for a communication of the sensor data. The device in the example has a data link 112 which connects the at least one processor 102, the at least one memory 104, and input device 106 for a transmission of data.

In the example, it is provided that for training or inference purposes using the artificial neural network, input variable x $\in R^n$ for the artificial neural network is determined with the aid of the values. It may also be provided that input variable x is determined from training data or test data that include a multitude of sensor data previously measured by sensor 108. It may also be provided that the training data or test data include values for input variable x that simulate sensor data that are measurable by sensor 108. It may also be provided that the training data or test data include values for input variable x by which sensor data are able to be generated by a generative artificial neural network which are measurable by sensor 108.

The sensor data, input variable x, the training data or the test data are able to be stored in the at least one memory 104.

The sensor data and/or the input variable x may represent a digital image, in particular a video, radar, LiDAR, ultrasonic or infrared image.

The artificial neural network may be designed to classify sensor data, in particular for detecting objects in the sensor data or for a semantic segmentation.

The artificial neural network may be designed to provide a regression for sensor data, in particular for detecting objects in the sensor data or for a semantic segmentation.

The artificial neural network is designed to output an output variable y. Output variable y represents a signal for the actuation of a physical system.

In the example, device 100 includes an output device 114, which is designed to output a signal as a function of output variable y for the actuation of a physical system. In the example, output device 114 is connected via a data link 112 to the at least one processor 102.

Output device 114, for instance, is designed to actuate a computer-controlled machine 116 as a function of output variable y. In the example, output device 114 and computer-controlled machine 116 are connected via a control line 118 for the transmission of the signal. Computer-controlled machine 116, for instance, is a robot, a vehicle, a household appliance, a driven tool, a production machine, a personal assistance system, an access control system, a monitoring system, or an in particular imaging medical system.

In addition or as an alternative, it may also be provided that output device 108 is designed to actuate a data transmission system as a function of output variable y.

For autonomous driving or other applications, it may be provided that output variable y classifies the sensor data, in particular in order to detect objects in the sensor data or for a semantic segmentation.

For autonomous driving and other applications, it may be provided that output variable y provides a regression for sensor data, in particular for detecting objects in the sensor data and for a semantic segmentation.

In this context, objects preferably represent markings or objects on or of road surfaces. The objects represent road signs, pedestrians, or vehicles, for example.

The artificial neural network in the example includes a first layer, which is referred to as an input layer in the following text. The artificial neural network in the example includes a final layer, which is denoted as an output layer in the following text.

In the example, at least one hidden layer is situated between the input layer and the output layer. The input layer in the example is a layer without an activation function. The output layer in the example is a layer having an activation function.

It may be provided that a layer hidden in the network is developed with an activation function or without an activation function. A layer without an activation function is also referred to as an affine layer in the following text.

Weights of a layer j are stored in a matrix $A_j$ in the example.

A matrix A for the input layer maps input variable x to an output of the input layer. The input layer in the example has a plurality n of dimensions.

The weights of a plurality of adjoining affine layers are able to be combined in a matrix A. In this case, the output is the output of the last one of the combined layers. In the example of two mutually adjoining affine layers $A_1, A_2$, they are combined in the matrix $A = A_2 \cdot A_1$.

Figure 2:
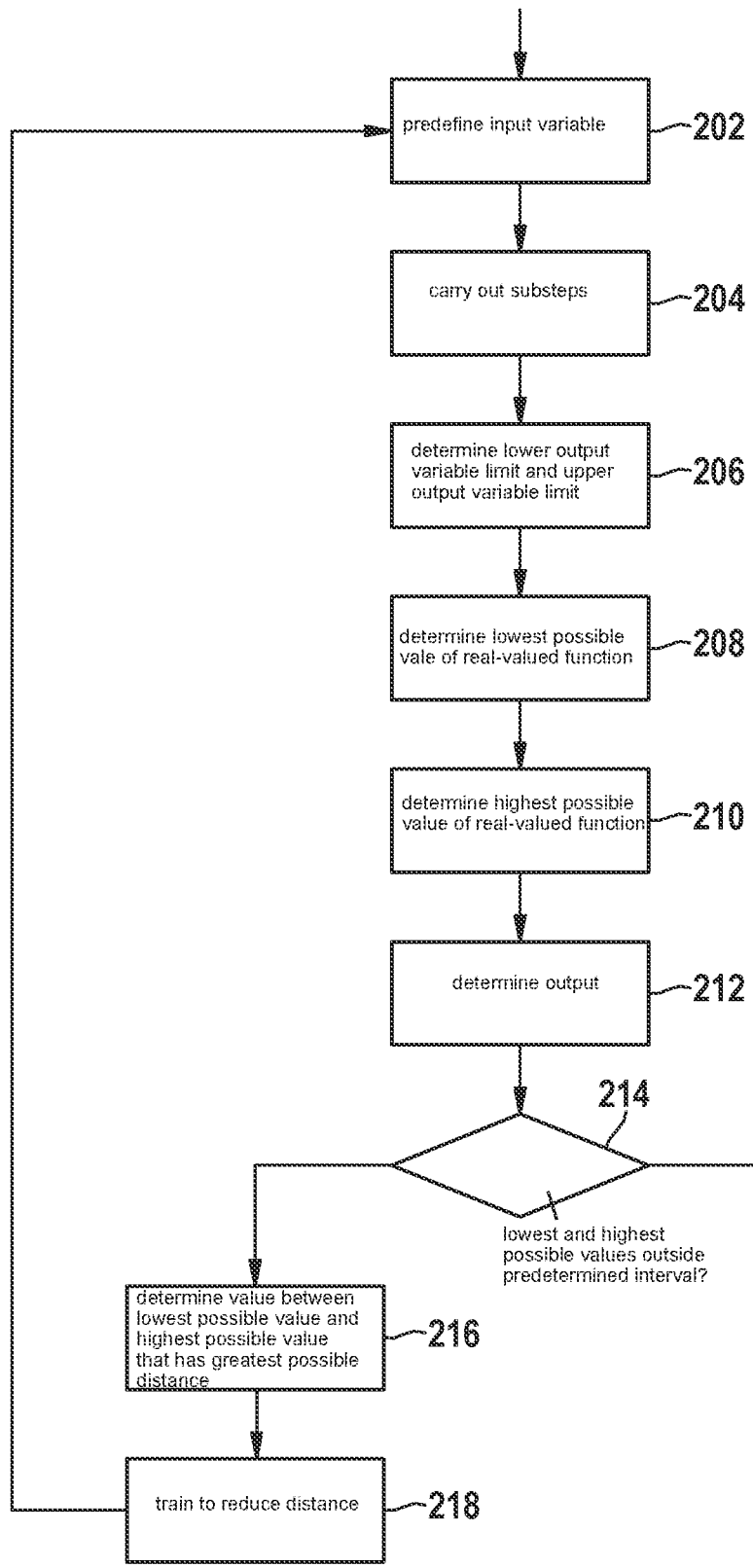
FIG. 2 shows a diagram of a method for training and/or verifying a robustness of an artificial neural network, in accordance with an example embodiment of the present invention.

A method for training and/or verifying the robustness of an artificial neural network will be described in the following text. Steps of the method are schematically illustrated in FIG. 2.

The artificial neural network is designed to determine output variable $y \in R^k$.

Two cases are distinguished in the following text.

$$y = f_w(x) \quad \text{Case 1}$$

$$y = f_{A,b,w}(x) \quad \text{Case 2}$$

In case 1, the linear layer of the artificial neural network without an activation function is an input layer of the artificial neural network.

In case 2, a multitude of linear layers without an activation function is situated between an input of the artificial neural network and the output of the linear layer of the artificial neural network without an activation function. In case 2, at least the input layer is affine. This means that the artificial neural network $x \to f_{A,b,w}(A \cdot x - b)$ includes a part $x \to A \cdot x - b$, followed by an artificial neural network $f_w$, where $(A_2(A_1 \cdot x - b_1) - b_2) = A \cdot x - b$ with $A = A_2 \cdot A_1$ and $b = A_2 b_1 + b_2$.

In both cases, a disturbance variable model $T(x) \in R^n$ is provided by which the input variable x is able to be mapped to a disturbed input variable x. The disturbance variable model $T(x)$ is preferably convex.

In the example, a function $opt(c;x) = \max_{\hat{x} \in T(x)} \langle c, \hat{x} \rangle$ for all $c \in R^n$ is defined for disturbance variable model $T(x)$. If $T(x) = \{\hat{x} \in R^n | \|x - \hat{x}\|_p \leq \varepsilon\}$ with $\varepsilon > 0$ and $p \geq 1$ including $\infty$, it is possible to determine an explicit solution for $opt(c;x)$ with the $L^p$ norm.

With $q = p/p-1$ for $1 < p < \infty$ and $q = \infty$ and $q = 1$ for $p = 1$ and $p = \infty$, $$opt(c;x) = \langle c, x \rangle + \varepsilon \cdot \|c\|_q$$

For $1 \leq i \leq N$, an upper input variable limit $$u_i = \max_{\hat{x} \in T_1(x)} \langle e_i, \hat{x} \rangle = opt(A^T e_i; x) - b_i$$

and a lower input variable limit $$l_i = \min_{\hat{x} \in T_1(x)} \langle e_i, \hat{x} \rangle = -opt(-A^T e_i; x) - b_i$$

are defined for $T_1(x) = \{A \cdot \hat{x} - b | \hat{x} \in T(x)\}$.

For disturbance variable models with an $L^p$ norm, the upper input variable limit is $$u_i = \langle A \cdot x - b, e_i \rangle + \varepsilon \cdot \|A^T e_i\|_q$$

and the lower input variable limit is $$l_i = \min_{\hat{x} \in T_1(x)} \langle e_i, \hat{x} \rangle = \langle A \cdot x - b, e_i \rangle - \varepsilon \cdot \|A^T e_i\|_q$$

In contrast, the present method makes it possible to indicate a solution without determining the maximizer $T_1(x)$.

The present method includes a step 202.

In step 202, input variable $x \in R^n$ is predefined, which has a plurality n of dimensions. In step 202, disturbance model $T(x)$ is predefined in the example. In step 202 in the example, an in particular real-valued function $l:R^k \to R$ is predefined. In step 202, an interval $l \subset R$ of values is predefined in the example, which lead to a certified artificial neural network.

It may be provided that input variable x is determined as a function of a measured signal or is selected from a value range.

A step 204 is carried out next.

Step 204 includes substeps, which in case 1 are carried out for each dimension $1 \leq i \leq n$ of input variable x. In case 2, the substeps are carried out for each dimension $1 \leq i \leq N$ of an output of a linear layer of the artificial neural network without an activation function to which input variable x is mapped by the artificial neural network.

Substep 1: Determining an upper input variable limit $u_i$.

In the example, upper input variable limit $u_i$ is determined for which disturbance variable model $T(x) \subset R^n$ has the largest possible value in the dimension i.

Substep 2: Determining a lower input variable limit $l_i$.

In the example, lower input variable limit $l_i$ for which disturbance variable model $T(x) \subset R^n$ has the lowest possible value in the dimension i is determined.

Case 1:

The present method may provide that for each dimension $1 < i$ n of input variable x, the lower input variable limit $l_i$ of this dimension i for which a first scalar product $(-e_i; x)$ of a negative unit vector $-e_i$ of this dimension i with input variable x has the largest possible value is determined. These limits are preferably determined for output variables $l \leq y \leq u$ with $l, u \in R^k$.

In the example, lower input variable limit $$l_i = -opt(-e_i; x)$$

is determined for 1 i n.

The present method may provide that for each dimension $1 < i$ n of input variable x, the upper input variable limit $u_i$ of this dimension i is determined for which a second scalar product $(e_i;x)$ of the unit vector $e_i$ of this dimension i with input variable x has the highest possible value. In the example, these limits are preferably determined for output variable $y=f_w(x)$. These limits for output variables $l \le y \le u$ with $l,u \in R^k$ are preferably determined. In the example, the upper input variable limit $$u_i = opt(e_i;x)$$

is determined for $1 \le i \le n$.

It may be provided that the artificial neural network provides a bias b for input variable x, and the method provides that the lower input variable limit $l_i$ and upper input variable limit $u_i$ are corrected as a function of bias b.

Case 2:

In the example, the output of the linear layer of the artificial neural network without activation function is defined either by matrix A of the affine layer or by matrix A in which, starting with the first layer of the artificial neural network, the consecutive affine layers are combined.

For each dimension $1 \le i \le N$ of the output defined by this matrix A, a first product is defined by a multiplication of a negative transpose $-A^T$ of matrix A with a unit vector $e_i$ of this dimension i is able to be determined.

The method may provide that the lower input variable limit $l_i$ for each dimension i for which a first scalar product $(-A^T e_i;x)$ of the first product with input variable x has the highest possible value is determined.

For each dimension $1 \le i \le N$ of the output defined by this matrix A, a second product is defined which is able to be determined by a multiplication of a transpose $A^T$ of matrix A with the unit vector $e_i$ of this dimension i.

The method may provide that the upper input variable limit $u_i$ of this dimension i for which a second scalar product $(A^T e_i;x)$ of the second product with input variable x has the highest possible value is determined.

In the example, these limits are determined for output variable $y=f_{A,b,w}(x)$. These limits are preferably determined for $l \le y \le u$ with $l,u \in R^k$ output variables.

It may be provided that the artificial neural network provides a bias b for the output. In this case, the method may provide that the lower input variable limit $l_i$ and the upper input variable limit $u_i$ are corrected as a function of bias b. If the artificial neural network has two consecutive affine layers, matrix is $A=A_2'A_1$ and bias $b=A_2 b_1+b_2$, for example.

Next, a step 206 is carried out.

In step 206, a lower output variable limit $l_{yj} \in R^k$ and an upper output variable limit $u_{yj} \in R^k$ are determined for output variable y for each dimension $1 \le j \le k$ of output variable y.

In the example, upper output variable limit $u_y$ and lower output variable limit $l_y$ are determined using the values from the value range restricted by the upper input variable limits $u_1, \ldots, u_n$ and the lower input variable limits $l_1, \ldots, l_n$.

In the following text, three options for determining upper output variable limit $u_y$ and lower output variable limit $l_y$ in case 1 are described by way of example.

Option 1: It is provided that the artificial neural network $f_w(x)$ includes an activation layer $\phi:R \to R$ for each element $x_i$ of input variable x, and an upper input variable limit $x_i < u_i$ is defined for each element $x_i$.

In the example, $L_j=\min O(z)$ and $Uj=\max \#(z)$ are determined and the upper output variable limit $u_{yj}=L_j \le O(x_i) \le U_j$ and also the lower output variable limit $l_{yj}=L_j \le \phi(x_i) \le U_j$ are determined. It may be provided that the upper output variable limit $u_{yj}$ is randomly predefined from this range. It may be provided to randomly predefine the lower output variable limit $l_{yj}$ from this range. If $\phi$ is monotonic, then $L_i=\phi(l_i)$ and $U_i=\phi(u_i)$ may be used.

Option 2: It is provided that the artificial neural network $f_w(x)$ includes s scalar product $(c,x)+\beta$ with a bias $\beta$ for input variable x, and an upper input variable limit $x_i \le u_i$ and a lower input variable limit $l_i \le x_i$ are defined for each element $x_i$.

In the example, vectors $c^+$ and $c^-$ are determined, where $c_i^+ = \min(c_i, 0)$ and $c_i^- = \max(c_i, 0)$. Next, $L=(c^-, u)+(c^+, l)+\beta$ and $U=(c^-, l)+(c^+,u)+\beta$ are determined. As a result of the scalar product, $L_i \le (c,x)$ UL is determined with values for $l_i < x_i < u_i$.

The upper output variable limit $u_y$ and the lower output variable limit $l_y$ are determined by mapping the result of the scalar product $(c,x)+\beta$ with the bias with the rest of the artificial neural network $f_w(x)$.

Option 3: It is provided that the artificial neural network $f_w(x)=A \cdot x+b$ includes a linear layer A with a bias b for input variable x.

In the example, a scalar product is determined with row j from matrix A for each element $y_j$ of output variable $y=A \cdot x+b$, and the calculation is carried out as described in option 2 for each scalar product.

If no bias is provided, this calculation is performed using bias b=0 in the example.

In case 2, the calculation is performed as previously described for case 1, the input variable x being replaced by the output defined by matrix A.

Next, a step 208 is carried out.

In step 208, the lowest possible value $y_-=\min_{l \le \hat{y} \le u} l(\hat{y})$ of the especially real-valued function $l:R^k \to R$ is determined. The lowest possible value $y_-$ is determined with values from a value range restricted by the lower output variable limit $l \in R^k$ and the upper output variable limit $u \in R^k$.

Next, a step 210 is carried out.

In step 210, the highest possible value $y_+=\max_{l \le \hat{y} \le u} l(f)$ of the especially real-valued function $l:R^k \to R$ is determined. The highest possible value $y_+$ is determined using values from the value range restricted by the lower output variable limit $l \in R^k$ and the upper output variable limit $u \in R^k$.

Next, a step 212 is carried out.

In step 212, an output is determined that confirms a robustness of the network if the lowest possible value $y_-$ and the highest value possible $y_+$ lie within a predefined interval $I \in R$ of permissible values.

Training may optionally be provided, and it is checked in a step 214 whether the lowest possible value $y_-$ or the highest possible value $y_+$ lies outside the predefined interval $I \in R$ of permissible values or lies on its boundary.

If the lowest possible value $y_-$ or the highest possible value $y_+$ lies outside the predefined interval $I \subset R$ of permissible values or on its boundary, then a step 216 will be carried out. In the other case, the training concludes in the example.

It may optionally be provided that input variables are acquired after the training and mapped to output variables, and—depending on a respective output variable—the signal for actuating the physical system or sensor data is/are determined and/or output, in particular.

In step 216, a value from an interval between the lowest possible value $y_-$ and the highest possible value $y_+$ is determined that has the greatest possible distance $\max_{y_- \le a \le y_+, \beta \in I} (a-\beta)^2$ from the interval.

A step 218 is subsequently carried out.

In step 218, the network is trained to reduce the distance.

Next, step 202 is carried out.

What is claimed is:

1. A method for training and/or verifying a robustness of an artificial neural network in which the artificial neural network is configured to determine an output variable, the method comprising the following steps:
predefining an input variable for the artificial neural network that has a plurality of dimensions, for each dimension of the input variable or for each dimension of an output of a linear layer of the artificial neural network without an activation function to which the input variable is mapped by the artificial neural network, performing:
determining an upper input variable limit for which a disturbance model by which the input variable is able to be mapped to a disturbed input variable has a highest possible value in the dimension, and
determining a lower input variable limit for which the disturbance variable model has a lowest possible value in the dimension;
for each dimension of the output variable, performing:
determining a lower output variable limit for the output variable with values from a value range restricted by the lower input variable limits and the upper variable limits, and
determining an upper output variable limit for the output variable with the values from the value range restricted by the upper input variable limits and the lower input variable limits;
determining a lowest possible value of a real-valued function with values from a value range restricted by the lower output variable limit and the upper output variable limit;
determining a highest possible value of the real-valued function with values from the value range restricted by the lower output variable limit and the upper output variable limit; and
determining an output that confirms a robustness of the network when the lowest possible value and the highest possible value lie within a predefined interval of permissible values.

2. The method as recited in claim 1, wherein the input variable represents a digital image or a video or a radar image or a LiDAR image or an ultrasonic image or an infrared image.

3. The method as recited in claim 1, wherein the output variable represents a signal for actuating a physical system or a computer-controlled machine or a data transmission system or a robot or a vehicle or a household appliance or a driven tool of a production machine or a personal assistance system or an access control system or a monitoring system or a medical imaging system.

4. The method as recited in claim 1, wherein:
the output variable classifies sensor data for detecting objects in the sensor data or for a semantic segmentation, or
the output variable provides a regression for sensor data for detection of objects in the sensor data or for a semantic segmentation; and
wherein the objects represent markings or objects on or of road surfaces, including objects representing street signs or pedestrians or vehicles.

5. The method as recited in claim 1, wherein for each dimension of the input variable, the lower input variable limit of the dimension for which a first scalar product of a negative unit vector of the dimension with the input variable has the highest possible value is determined, and for each dimension of the input variable, the upper input variable limit of the dimension for which a second scalar product of a unit vector of the dimension with the input variable has the highest possible value is determined.

6. The method as recited in claim 5, wherein the artificial neural network provides a bias for the input variable or the output, the lower input variable limit and the upper input variable limit being corrected as a function of the bias.

7. The method as recited in claim 1, wherein the output of the linear layer of the artificial neural network without an activation function is defined by a matrix, and for each dimension of the output, a first product is defined which is determined by a multiplication of a negative transpose of the matrix with a unit vector of the dimension, and the method provides that the lower input variable limit of the dimension for which a first scalar product of the first product with the input variable has a highest possible value is determined, and for each dimension of the output, a second product is defined which is determined by a multiplication of a transpose of the matrix with the unit vector of the dimension, and the method provides that the upper input variable limit of the dimension for which a second scalar product of the second product with the input variable has the highest possible value is determined.

8. The method as recited in claim 6, wherein the linear layer of the artificial neural network without an activation function is an input layer of the artificial neural network, or a multitude of linear layers without an activation function is situated between an input of the artificial neural network and the output of the linear layer of the artificial neural network without an activation function.

9. The method as recited in claim 1, wherein the input variable is determined as a function of a measured signal or is selected from a value range.

10. The method as recited in claim 1, wherein when the lowest possible value or the highest possible value lies outside the predefined interval of permissible values or on its boundary, a value from an interval between the lowest possible value and the highest possible value is determined that has the largest possible distance from the interval, and the network is trained to reduce the distance.

11. A device, comprising:
at least one processor device for training and/or verifying a robustness of an artificial neural network in which the artificial neural network is configured to determine an output variable, the at least one processor configured to:
predefine an input variable for the artificial neural network that has a plurality of dimensions, for each dimension of the input variable or for each dimension of an output of a linear layer of the artificial neural network without an activation function to which the input variable is mapped by the artificial neural network:
determine an upper input variable limit for which a disturbance model by which the input variable is able to be mapped to a disturbed input variable has a highest possible value in the dimension, and
determine a lower input variable limit for which the disturbance variable model has a lowest possible value in the dimension;
for each dimension of the output variable:
determine a lower output variable limit for the output variable with values from a value range restricted by the lower input variable limits and the upper variable limits, and
determine an upper output variable limit for the output variable with the values from the value range restricted by the upper input variable limits and the lower input variable limits;

determine a lowest possible value of a real-valued function with values from a value range restricted by the lower output variable limit and the upper output variable limit;

determine a highest possible value of the real-valued function with values from the value range restricted by the lower output variable limit and the upper output variable limit; and determine an output that confirms a robustness of the network when the lowest possible value and the highest possible value lie within a predefined interval of permissible values.

12. The device as recited in claim 11, wherein the device has at least one memory for the input variable, and an output device, the input variable representing sensor data or the input variable representing variables that are measurable by a sensor by which sensor data are able to be predicted, and the output device is configured to output a signal, and the processor device is configured to determine the signal as a function of the output variable to which the artificial neural networks maps the input variable.

13. The device as recited in claim 11, wherein the device includes an input device, the input device being configured to communicate with a sensor in order to acquire sensor data, and the processor device is configured to determine the input variable as a function of the sensor data.

14. A non-transitory computer-readable medium on which is stored a computer program including computer-readable instructions for training and/or verifying a robustness of an artificial neural network in which the artificial neural network is configured to determine an output variable, the instructions, when executed by a computer, causing the computer to perform the following steps:

predefining an input variable for the artificial neural network that has a plurality of dimensions, for each dimension of the input variable or for each dimension of an output of a linear layer of the artificial neural network without an activation function to which the input variable is mapped by the artificial neural network, performing:

determining an upper input variable limit for which a disturbance model by which the input variable is able to be mapped to a disturbed input variable has a highest possible value in the dimension, and determining a lower input variable limit for which the disturbance variable model has a lowest possible value in the dimension;

for each dimension of the output variable, performing:

determining a lower output variable limit for the output variable with values from a value range restricted by the lower input variable limits and the upper variable limits, and determining an upper output variable limit for the output variable with the values from the value range restricted by the upper input variable limits and the lower input variable limits;

determining a lowest possible value of a real-valued function with values from a value range restricted by the lower output variable limit and the upper output variable limit;

determining a highest possible value of the real-valued function with values from the value range restricted by the lower output variable limit and the upper output variable limit; and determining an output that confirms a robustness of the network when the lowest possible value and the highest possible value lie within a predefined interval of permissible values.

\* \* \* \* \*